US007889099B2

(12) United States Patent
Aubrey et al.

(10) Patent No.: US 7,889,099 B2
(45) Date of Patent: Feb. 15, 2011

(54) PARKING-ZONE MANAGEMENT SYSTEM

(75) Inventors: Kenneth Aubrey, München (DE); Erwin Braukmann, Wolfratshausen (DE); Tilo Krebs, Würzburg (DE)

(73) Assignee: Siemens Aktiengesellschaft, Munich (DE)

( * ) Notice: Subject to any disclaimer, the term of this patent is extended or adjusted under 35 U.S.C. 154(b) by 521 days.

(21) Appl. No.: 11/732,429

(22) Filed: Apr. 3, 2007

(65) Prior Publication Data

US 2007/0257818 A1 Nov. 8, 2007

(30) Foreign Application Priority Data

Apr. 4, 2006 (DE) ....................... 10 2006 016 050

(51) Int. Cl.
*B60Q 1/48* (2006.01)

(52) U.S. Cl. ................ 340/932.2; 340/905; 340/995.26

(58) Field of Classification Search .............. 340/932.2, 340/928, 951, 952–955, 972, 903, 905, 907–908, 340/991–994, 995.26
See application file for complete search history.

(56) References Cited

U.S. PATENT DOCUMENTS 5,475,377 A * 12/1995 Lee ............................ 340/5.9
6,812,857 B1 11/2004 Kassab et al.
7,312,722 B2 * 12/2007 Tillotson et al. ......... 340/932.2
7,330,131 B2 * 2/2008 Zanotti et al. ............ 340/932.2
2002/0109610 A1 * 8/2002 Katz ....................... 340/932.2
2002/0109611 A1 8/2002 Howard
2003/0009278 A1 * 1/2003 Mallet et al. ................ 701/120
2003/0128630 A1 * 7/2003 Krygler et al. ................ 368/90
2003/0132840 A1 7/2003 Bahar
2004/0068433 A1 * 4/2004 Chatterjee et al. ............. 705/13
2004/0181496 A1 9/2004 Odinotski et al.
2005/0228715 A1 * 10/2005 Hartig et al. .................. 705/13

FOREIGN PATENT DOCUMENTS

DE 43 20 918 A1 2/1995
DE 197 20 415 C1 7/1998
JP 09211144 * 2/1996
WO 0023949 A1 4/2000

* cited by examiner

*Primary Examiner*—Daniel Previl

(57) ABSTRACT

The invention relates to a system for the management of a parking zone with chargeable parking spaces for vehicles, in particular of a parking zone sited at or on a public road, comprising an automatic machine for the payment of a parking fee for a parking space, said machine being assigned to the parking spaces. A parking-zone management system is provided which can indicate the current occupancy status of the parking spaces of the managed parking zone in an up-to-date manner and as accurately as possible, whereby at least one vehicle detector which is configured for determining the occupancy status of the parking space is arranged on each parking space, and whereby communication means, by means of which data representing the occupancy status can be transmitted, is provided for wireless data transmission between each respective vehicle detector and the automatic parking-fee machine.

14 Claims, 2 Drawing Sheets

PARKING-ZONE MANAGEMENT SYSTEM

CROSS REFERENCE TO RELATED APPLICATIONS

This application claims the benefits of German application No. 10 2006 016 050.9 filed Apr. 4, 2006, and is incorporated by reference herein in its entirety.

FIELD OF INVENTION

The invention relates to a system for managing a parking zone with chargeable parking spaces for vehicles, comprising an automatic machine for the payment of a parking fee for a parking space, said machine being assigned to the parking spaces.

BACKGROUND OF THE INVENTION

The high volume of passenger transport vehicles, in particular of cars, makes the management of parking space, above all in urban areas, very important. For the management of parking space, the key issues of which are the collection of parking fees, information about available parking space and monitoring of the payment of fees, systems for the management of parking zones are known that are automated to a greater or lesser extent. A parking zone is understood here to be a facility having multiple chargeable parking spaces for vehicles. Parking zones or parking areas occur in the form of usually privately-operated car parks or multi-storey car parks which as a rule have barrier-controlled entries and exits, or at or on public roads in the form of local-authority-managed parking ranks, parking bays, parking islands and such like.

A traffic management system, as is deployed in many cities, is known from the published application DE 43 20 918 A1. Here, the free parking spaces in multi-storey car parks and car parks are determined by working out the difference between the numbers of vehicles driving in and the numbers of vehicles driving out. Optimum routes to parking space which is not yet fully occupied are indicated on display boards in the approaches to the city centre or through transmission to individual navigation systems in the vehicles. In this way, a vehicle driver looking for parking space knows where he can still find a parking space and can head for this in a targeted manner, which greatly reduces the traffic looking for parking space.

The recording of free parking space in publicly accessible parking zones with automatic parking-ticket machines is more difficult to organize. Here the arrival time of a vehicle is known through the purchasing of the parking ticket, but not its precise departure time. DE 43 20 918 A1 discloses in this regard a recording device integrated in the automatic parking-ticket machine for recording the number of vehicles, by means of which device the current occupancy can be determined relatively precisely by allowing for a certain "redundancy".

In this respect, a method is known from patent specification DE 197 20 415 C1 for determining a parking space occupancy in a publicly accessible parking zone in which parking in a parking-zone period is subject to a charge. An automatic parking-ticket machine assigned to the parking zone outputs parking tickets with a validity period corresponding to the anticipated parking time. The parking zone is integrated in a parking management system which comprises a central installation connected to the automatic parking-ticket machine and display devices connected to the central installation, which display devices give information about free parking zones for vehicle drivers looking for parking space. The parking-zone time is subdivided into time intervals to which a counter is assigned, the predetermined maximum value of which corresponds to the number of available parking spaces. At a predetermined point in time, the respective counter reading of all counters is set to zero. When the parking ticket is output, the counter reading of those counters whose assigned time interval is contained in the validity period of the parking ticket is increased by one. The current number of free parking spaces is determined by working out the difference of the counter reading for the current time interval and the maximum value of available parking spaces. However, this method features the uncertainty as to whether the validity period of the purchased parking ticket matches the actual period of occupancy of the parking space by a vehicle. It also remains uncertain precisely which of the available parking spaces of a parking zone is occupied or which is free.

The monitoring of whether a vehicle occupies a parking space for longer than the validity period of the purchased parking ticket is, as is known, a personnel-intensive process. Inspection personnel have to take stock of every parked vehicle in order to check whether a parking ticket was purchased at all or whether the validity period of the purchased parking ticket has expired.

SUMMARY OF INVENTION

The object of the invention is to provide a parking-zone management system which can indicate promptly and as accurately as possible the current occupancy status of the parking spaces of the managed parking zone.

The object is achieved according to the invention in a parking-zone management system of the type cited in the introduction, which has the features of the claims. In that at least one vehicle detector is arranged on each parking space, said vehicle detector being configured for determining the occupancy status of the parking space, it can be determined for each parking space of a parking zone whether and when this space is free or is occupied by a vehicle. Communication means for wireless data transmission between each respective vehicle detector and the automatic parking-fee machine, by means of which data representing the occupancy status can be transmitted, allows information to be transmitted easily to the automatic parking-fee machine, which can be configured as an automatic parking-ticket machine—or, in the case of multi-storey car parks or car parks with entry control, as an automatic cashier machine. Precise occupancy information is thus available in the automatic parking-fee machine about every parking space of a parking zone assigned to the machine, which information requires neither a manual counting of vehicles on site nor the use of evaluation algorithms of purchased parking tickets, which are prone to uncertainty.

In an advantageous embodiment of the parking-zone management system according to the invention in which the parking zone is sited at or on a public road and the parking spaces are marked as defined parking bays, the vehicle detectors per parking bay are arranged in number and position in a distributed manner such that a vehicle parked within a parking bay can definitely be detected. Parking bays on public land can be marked in different shapes and sizes by means of solid lines or raised kerbs and can be arranged as parking ranks or parking islands, for example, on the side of a road. For parking bays whose marking enforces the parking of just one car, one centrally arranged vehicle detector will be adequate for recording to be certain. For larger parking bays provided for occupancy by trucks or buses, more than one vehicle detector can be arranged so that the parking of a smaller vehicle in this parking bay can also be detected.

In a preferred embodiment of the parking-zone management system according to the invention, each vehicle detector is arranged below ground and fashioned such that a vehicle can roll over it. The embedding and fixing of a vehicle detector in the road surface of the publicly accessible parking zone avoids costly frames or supports for hanging vehicle detectors and provides a fast and inexpensive method of installation. The top side of the detector housing seals flush with the road surface and is fashioned such that it can withstand the loading of vehicles rolling over the vehicle detector or being supported thereon as well as the effects of the weather.

In a preferred embodiment of the parking-zone management system according to the invention, each vehicle detector has an autonomous power supply. With an eye to energy-saving operation in the vehicle detector, long-life batteries which have a service life of up to 10 years can be used to supply power. A maintenance cost due to changing batteries can therefore be kept very low.

In an advantageous embodiment of the parking-zone management system according to the invention, each vehicle detector has a magnetometer for recording a vehicle occupying the parking space. To establish whether a vehicle is located above the detector, the use of thin-layer sensors which change their resistance directly under the influence of a magnetic field or of Hall sensors suffices. Magnetometers of this type measure a change in the local magnetic field due to the presence of a vehicle.

In a further advantageous embodiment of the parking-zone management system according to the invention, the communication means has transceiver means for a radio transmission. These can be configured as an antenna, with control, at the detector end and at the automatic-machine end and have a range of about 30 m. The radio transmission operates on 16 channels in the 2.4 GHz ISM band.

In another preferred embodiment of the parking-zone management system according to the invention, a transmission of occupancy states of the parking spaces can be triggered by the vehicle detectors at the automatic parking-fee machines as a function of the time of day or on demand at the automatic-machine end. On the one hand, a radio transmission of detector data can take place at fixed times during the course of a day, for example, whenever experience indicates that an increased use of a parking zone is anticipated; in contrast, a transmission can be waived when the use of the parking zone is free of charge. On the other hand, the transmission of occupancy states can be requested by the automatic parking-fee machine when a demand for information about the occupancy status arises. The demand can be triggered for example by a higher-level control center or in the event of a scheduled checking of vehicles for adequate payment of parking fees.

In a preferred embodiment of the parking-zone management system according to the invention, at least one automatic parking-fee machine is connected to a parking control center which is configured to receive the occupancy states of all the parking spaces assigned to the automatic parking-fee machine and to control adjustable information signs displaying an overall occupancy status of parking zones. In this way, the precise occupancy information available about a parking zone at automatic parking-ticket machine level can be evaluated in real time or at least promptly and provided via information signs to road users looking for parking space. Traffic looking for parking space is thereby decreased and the associated noise nuisance and environmental pollution reduced.

In an additional or alternative embodiment of the parking-zone management system according to the invention, at least one automatic parking-fee machine is connected to a traffic management center which is configured to receive the occupancy states of all the parking spaces assigned to the automatic parking-fee machine and to provide traffic information based thereupon for other traffic information services. The current and accurate occupancy situation of the parking zones available in a city traffic network can for example advantageously be fed to a geographic information system, a strategy module of the traffic management center, the Internet or else to defined sign controls.

In a preferred embodiment of the parking-zone management system according to the invention, each parking space is assigned an unambiguous, space ID that can be recorded by a user, the automatic parking-fee machine having means for the selection of a parking space using its space ID and for the payment of a parking fee for the selected parking space. The space ID can for example exist as a number of the respective parking space of a parking zone that is printed on a sign, an overview chart or directly on the road surface. As the user of the parking zone pays a fee at the automatic parking-fee machine for the parking space selected by him, the current occupancy and payment information for each parking space is available in the automatic parking-fee machine. This forms the basis for effective monitoring with regard to the payment of parking fees in a parking zone.

In an advantageous embodiment of the parking-zone management system according to the invention, means for the evaluation of payment states and occupancy states with regard to wrongly occupied parking spaces are provided, which means are arranged in the automatic fee machine or in a control center managing multiple automatic parking-fee machines. By comparing the current occupancy status of a parking space with the payment state for this parking space, it can be established unambiguously whether a fee for an occupied parking space has been paid at all or whether a fee that is still adequate up to the current point in time has been paid. The information on such wrongly occupied parking spaces—i.e. parking spaces occupied by a vehicle but not adequately paid for—is thus available in an automatic parking-fee machine or else also in a higher-level automatic parking-fee machine control center and can organize inspection rounds for example by prioritizing substantially more effectively and in a more targeted manner.

The evaluation means are preferably configured for determining all the wrongly occupied parking spaces that lie within a defined geographical area. If the inspection personnel commences its inspection round for example at an automatic parking-fee machine control center, then the evaluation means can determine all the wrongly occupied parking spaces that lie within a radius of 100 m around the control center. The inspection personnel can then rum through the wrongly occupied parking spaces selectively in order to penalize those parking wrongly.

However, the evaluation means can also be configured for determining all wrongly occupied parking spaces, the wrong occupation of which exceeds a predeterminable time threshold. For example, the inspection personnel can have those wrongly occupied parking spaces determined on which vehicles have already been parked for longer than 30 minutes without payment of an adequate fee.

It is also possible to configure the evaluation means for determining a geographical area where the density of wrongly occupied parking spaces per unit area exceeds a predeterminable threshold value. The evaluation means thus determine a geographical area within which a particularly high number of wrongly occupied parking spaces exists. By this means, the inspection personnel can check a large number of potential unauthorized parkers with little time outlay.

In a preferred embodiment of the parking-zone management system according to the invention, the evaluation means have means for outputting the evaluation result. To prepare the inspection round, the evaluation result can in this way be made available to the inspection personnel wither directly at the automatic parking-ticket machine or in a control center for multiple automatic parking-ticket machines.

In a preferred embodiment of the parking-zone management system according to the invention, the output means are configured as printing mechanisms, it being possible for the evaluation result to be output as a paper list. Since in automatic parking-fee machines configured as automatic parking-ticket machines as well as in higher-level control centers, printers are already available, this represents a simple option for making the evaluation result available to inspection personnel and for giving it to them in a form that they can carry around while monitoring.

In another preferred embodiment of the parking-zone management system according to the invention, the output means are configured as display equipment, it being possible for the evaluation result to be output as a screen display. The inspection personnel who are positioned on site in a parking zone to be inspected can in this way, for example via the display of an automatic parking-fee machine configured as an automatic parking-ticket machine, call up a display of the evaluation result in order to trace in a targeted manner the particular parking spaces in the parking zone on which wrongly parked vehicles are parked.

However, the parking-zone management system according to the invention preferably has output means comprising an interface via which the evaluation result can be transmitted in the form of electronic data to a mobile monitoring device. The portable monitoring device is carried by the inspection personnel and connected via a communication interface to the evaluation means of the automatic parking-fee machine or the higher-level control center. The interface can be configured as a line-bound plug-in connector, a mobile radio or an infrared interface. The inspection personnel carry the occupancy/payment information on parking zones, in particular on wrongly occupied parking spaces, about with them on the monitoring device, which has a suitable input/output interface.

BRIEF DESCRIPTION OF THE DRAWINGS

An exemplary embodiment and further advantages of the parking-zone management system according to the invention are explained in detail below with the aid of drawing, in which.

DETAILED DESCRIPTION OF INVENTION

Figure 1:
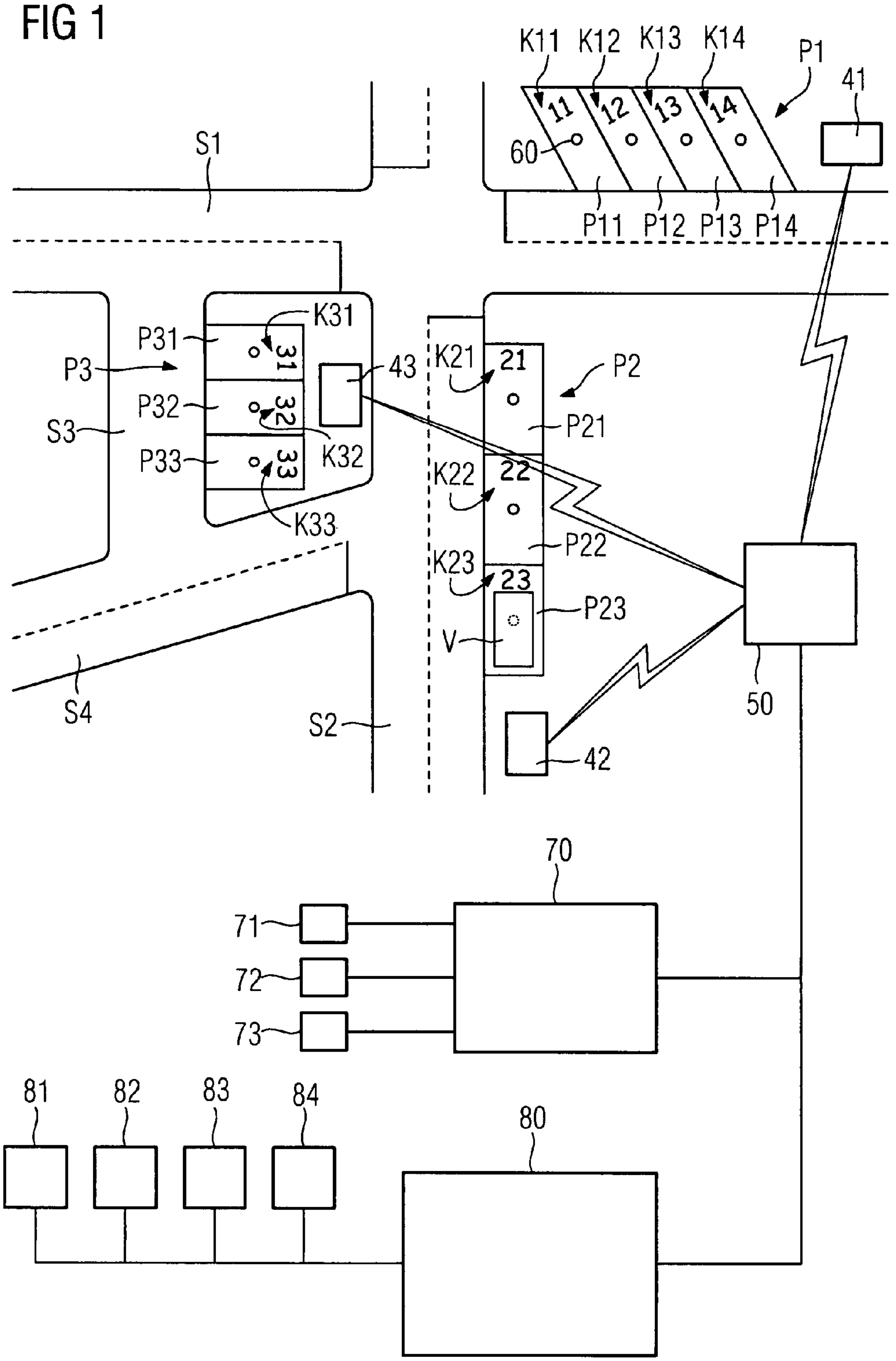
FIG. 1 illustrates schematically a management system according to the invention for parking zones with higher-level control centers.

A parking-zone management system according to the invention as per FIG. 1 serves the automated management of one or more parking zones P1, P2, P3, which are sited at or on a public road S1, S2, S3, S4. Accessible from the road S1 is the parking area P1 which has four parking spaces P11, P12, P13, P14 arranged at an oblique angle to the road S1, to which parking spaces an automatic parking-fee machine 41 for the payment of parking fees is assigned. Arranged along side of the road S2 is a parking rank P2 which has parking spaces P21, P22, P23 behind one another and aligned parallel with the road S2, to which parking spaces an automatic parking-fee machine 42 is assigned A car park P3 with parking spaces P31, P32, P33 at a right angle to the road S3 and aligns parallel with one another has an assigned automatic parking-fee machine 43.

An unambiguous space ID K11 to K33 which can be recorded by a user and is fashioned as a space number applied to the road surface of the respective parking space is assigned to each parking space P11 to P33. When a user parks his vehicle V, for example on the parking space P23 of parking zone P2, then the user notes the space ID K23 and goes with it to the automatic parking-fee machine 42 configured as an automatic parking-ticket machine. There, the user pays in the customary manner by inserting coins or else cashlessly with the aid of a cashcard for a parking ticket with the desired validity period, the user being able to input via selection and payment means 44 (cf. FIG. 2) of the automatic parking-fee machine 42 his space ID K23. Through payment of a parking fee, the payment state for the pang space P23 changes in the automatic parking-fee machine 42 to "paid" for the period corresponding to the fee amount.

The parking spaces P11 to P33 are demarcated by means of solid lines or delimited by raised kerbs and can have different shapes and sizes. According to the invention, at least one vehicle detector 60 is now arranged on each parking space P11 to P33, which vehicle detector is fashioned for determining the occupancy status of the parking space P11 to P33. In FIG. 1 the vehicle detector 60 is represented by a small circle in the middle of the parking space P11 to P33; for the sake of clarity, only the vehicle detector 60 of the parking space P11 is labeled with a reference character.

Figure 2:
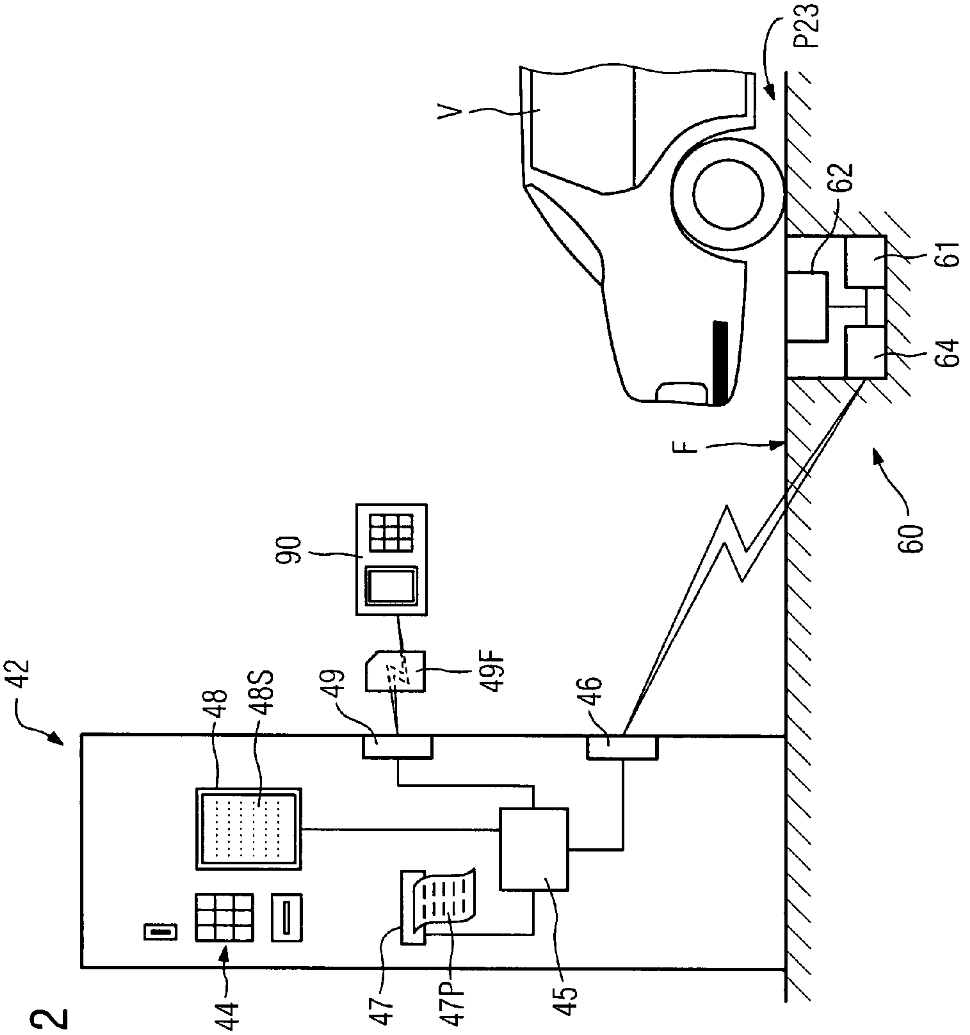
FIG. 2 illustrates schematically an automatic parking-fee machine and a vehicle detector of a parking-zone management system according to the invention.

According to FIG. 2, the vehicle detector 60 on the parking space P23 is arranged below ground F, for example embedded in the road surface and cemented therein, and fashioned such that it a vehicle V can roll over it. The vehicle detector 60 has for its autonomous power supply 61 a battery with a long service life which feeds a magnetometer 62 for detecting a vehicle V occupying the parking space P23. The magnetometer 62 can be fashioned as a Hall sensor or else as a thin-layer sensor for measuring the change in the local magnetic field as a result of the presence of the vehicle V.

For wireless data transmission between the vehicle detector 60 and the automatic parking-fee machine 42, communication means 46, 64 are provided by means of which data representing the occupancy status "occupied" or "free" can be transmitted. The communication means have transceiver means 46 at the automatic machine end and transceiver means 64 at the detector end, which transceiver means enable radio transmission in the 2.4 GHz frequency band on 16 channels. The vehicle detector 60 can thus be installed without being connected to a line-bound power supply and data transmission network with very limited time outlay and with no additional frames or supports for hanging it up.

When each vehicle detector transmits its occupancy status with an ID K23 identifying the parking space P23 to the automatic parking-fee machine 42, information is available in the automatic parking-fee machine 42 for each assigned parking space P21, P22, P23 about the payment and occupancy status thereof. This information serves for monitoring payment of parking fees in accordance with the regulations. For this purpose, means 45 for the evaluation of payment states and occupancy states with regard to wrongly occupied parking spaces P21 to P23 are provided in the automatic parking-fee machine 42. The evaluation means 45 deliver as a result all the wrongly occupied—i.e. occupied but not paid for at an or not adequately paid for—parking spaces P21 to P23.

The evaluation result can be made available to the inspection personnel via different output means. For example, the output means can be fashioned as a printing mechanism 47, it being possible for the evaluation result to be output as a paper list 47P. Furthermore, the output means can be formed by a display device 48 which outputs the evaluation result as a screen display 48S. Furthermore, the evaluation result can be transmitted in the form of an electronic file 49F via an interface 49 on the automatic parking-fee machine 42 to a portable monitoring device 90 carried with them by the inspection personnel. As a mobile terminal, the monitoring device 90 is equipped with an input/output facility known from mobile phones or personal digital assistants (PDA). The inspection personnel can thus obtain the evaluation result in different ways and thereby plan and implement in a targeted manner the aforementioned inspection round to the wrongly occupied parking spaces.

In this case, additional determining options of the evaluation means 45 can deliver further preliminary information in order to, prioritize the inspection round. In a first variant, the evaluation means are fashioned for determining all the wrongly occupied parking spaces which lie within a defined geographical area. In this way, all wrongly occupied parking spaces can be output that lie within a predeterminable radius of action, for example within a certain maximum distance from an automatic parking-ticket machine 42. In a further variant, the evaluation means are fashioned for determining all the wrongly occupied parking spaces, the wrong occupation of which exceeds a predeterminable time threshold. It has to be assumed with these vehicles that they will also remain parked there for the period until the inspection personnel has reached this vehicle locally. Finally, the evaluation means can be fashioned for determining a geographical area, for which the density of wrongly occupied parking spaces per unit area exceeds a predeterminable threshold value. The inspection personnel sets its focus here on a maximum "yield" from the inspection round within a geographical area with a particularly high frequency of wrongly occupied parking spaces.

The information available in the automatic parking-fee machines 41, 42, 43 about the current occupancy status of all the parking spaces P11 to P14, P21 to P23, P31 to P33 in the parking zones P1, P2, P3 can, however, according to the invention be used for other traffic information purposes. Different operating modes can be provided for transmitting the occupancy states from the vehicle detectors 60 to the assigned automatic parking-fee machines 41, 42, 43. Transmission can, for example, be carried out as a function of the time of day at fixed times. Here, no transmission can be provided at times that are free of charge and a high transmission rate at times of high utilization of the capacity of the parking zones P1 to P3. In addition, a transmission of the occupancy information can be triggered on demand by the automatic parking-fee machines 42 to 43.

The occupancy information is transmitted via radio from the automatic parking-fee machines 41 to 43 to an automatic parking-fee machine control center 50, superordinate to said machines, from where the occupancy information is forwarded to a parking control center 70 and/or to a traffic management center 80. In the parking control center 70, all the occupancy information form optionally a plurality of automatic parking-fee machine control centers 50 is received and processed in order to determine the current parking space occupancy within a traffic network which the parking control center 70 services. The current parking space occupancy is then shown by adjustable information signs 71, 72, 73 displaying an overall occupancy status of certain parking zones that are controlled from the parking control center 70. With the aid of the information on the signs 71 to 73, road users looking for a parking space can be guided as quickly as possible to a free parking space. The higher-level traffic management center 80 can feed the occupancy information of all parking zones to further traffic information services, say, to a geographic information system 81, a strategy module 82, the Internet 83 and a sign control 84.

A further advantage of the parking-zone management system according to the invention is that specific risk vehicles can be determined. By analyzing the occupancy and payment states, parking spaces can be determined on which vehicles are parked which have a particularly high wrong occupancy time. Also, the parking-zone management system according to the invention can be used to introduce and monitor a maximum parking duration for a parking zone. In other respects, through the installation of vehicle detectors, public traffic areas on which the parking of vehicles is broadly prohibited can be monitored.

The invention claimed is:

1. A system for the management of a parking zone with a plurality of parking spaces for vehicles, comprising:

an automated payment machine for receiving payment of a parking fee for a plurality of parking spaces in the parking zone and monitoring a payment state for each parking space;

a vehicle detector arranged on each parking space, the vehicle detector configured for determining an occupancy status of the parking space as being either free or occupied;

one or more communication devices configured to wirelessly transmit the occupancy status of the parking space between the vehicle detectors and the automatic parking-fee machine;

a central parking control center configured for collectively receiving the occupancy status for each parking space in the parking zone;

a display device for displaying an overall occupancy status of all the parking spaces in the parking zone to collectively show the occupancy status of each parking space in the parking zone as being either free or occupied;

an evaluation device in communication with the automated payment machine that evaluates, for each parking space in the parking zone, the payment state and occupancy status to determine all wrongly occupied parking spaces as those parking spaces that are occupied but not adequately paid for, wherein the evaluation device organizes and prioritizes inspection rounds in an evaluation result for such wrongly occupied parking spaces based on one or more of: (a) a number of wrongly occupied parking spaces within a predefined geographical area; (b) a number of wrongly occupied parking spaces that have exceeded a predetermined time threshold of being not adequately paid for; and (c) a number of wrongly occupied parking spaces that comprise a density per unit geographic area exceeding a predetermined threshold value.

2. The parking-zone management system of claim 1, wherein the parking zone is at or on a public road and the parking spaces are marked as defined parking bays, the vehicle detectors in each parking bay are arranged based on number and position so that detection of a vehicle by a detector is determinative as to which parking bay a vehicle is parked within.

3. The parking-zone management system of claim 2, wherein each vehicle detector is arranged below ground and configured so that when a vehicle passes over the vehicle detector on a parking space one of the communication devices transmits vehicle occupancy data to the automatic parking-fee machine.

4. The parking-zone management system as claimed in claim 3, wherein each vehicle detector has an autonomous power supply.

5. The parking-zone management system as claimed in claim 4, wherein each vehicle detector has a magnetometer for recording a vehicle occupying the parking space.

6. The parking-zone management system as claimed in claim 5, wherein the communication device has a transceiver device for a radio transmission.

7. The parking-zone management system as claimed in claim 6, wherein a transmission of occupancy states of the parking spaces from the vehicle detectors to the automatic parking-fee machine can be triggered as a function of the time of day or on demand by the automatic machine.

8. The parking-zone management system as claimed in claim 7, wherein the parking control center is configured for controlling adjustable information signs displaying the overall occupancy status of all the parking spaces in the parking zones.

9. The parking-zone management system as claimed in claim 8, wherein the automatic parking-fee machine is connected to a traffic management center configured for receiving the occupancy states of all the parking spaces assigned to the automatic parking-fee machine and for providing traffic information based on other traffic information services.

10. The parking-zone management system as claimed in claim 9, wherein a user recordable unambiguous space ID is assigned to each parking space, and the automatic parking-fee machine selects a parking space from its space ID and for the payment of a parking fee for the selected parking space based on input of the space ID.

11. The parking-zone management system as claimed in claim 1, wherein the payment state evaluation device comprises an output device for outputting the evaluation result.

12. The parking-zone management system as claimed in claim 11, wherein the output device is a printing mechanism configured to output the evaluation result as a paper list.

13. The parking-zone management system as claimed in claim 11, wherein the output device is a display device configured for the evaluation result to be output as a screen display.

14. The parking-zone management system as claimed in claim 11, wherein the automated payment machine includes the evaluation device and the output device comprises an interface, through which the evaluation result is transmitted from the automated payment machine as electronic data to a mobile monitoring device.

* * * * *